US012387098B2

United States Patent
Gaopande et al.

(10) Patent No.: US 12,387,098 B2
(45) Date of Patent: Aug. 12, 2025

(54) MULTI-TASK LEARNING

(71) Applicant: Ford Global Technologies, LLC, Dearborn, MI (US)

(72) Inventors: Meghana Laxmidhar Gaopande, Sunnyvale, CA (US); Nikita Jaipuria, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 18/191,362

(22) Filed: Mar. 28, 2023

(65) Prior Publication Data
US 2024/0330676 A1    Oct. 3, 2024

(51) Int. Cl.
*G06N 3/08* (2023.01)
*G06V 10/74* (2022.01)
*G06V 10/82* (2022.01)

(52) U.S. Cl.
CPC .............. *G06N 3/08* (2013.01); *G06V 10/761* (2022.01); *G06V 10/82* (2022.01)

(58) Field of Classification Search
CPC .......... G06N 3/08; G06N 3/045; G06N 3/084; G06N 3/096; G06N 3/0464; G06V 10/761; G06V 10/82; G06V 10/454; G06V 10/764
See application file for complete search history.

(56) References Cited

U.S. PATENT DOCUMENTS

| | | | |
|---|---|---|---|
| 8,622,431 B2 | 1/2014 | Singh | |
| 9,295,234 B2 | 3/2016 | Shewfelt | |
| 10,189,435 B2 | 1/2019 | Templeton | |
| 2019/0034814 A1 | 1/2019 | Amer et al. | |
| 2019/0244108 A1 | 8/2019 | Meyerson et al. | |

FOREIGN PATENT DOCUMENTS

| | | | | |
|---|---|---|---|---|
| CN | 111582043 A | * | 8/2020 | ........... G06K 9/0063 |
| CN | 114821538 A | * | 7/2022 | ........... G06F 18/241 |

OTHER PUBLICATIONS

"Dog Car Harness | Impact Car Safety Harness", https://www.kurgo.com/harnesses/impact-dog-car-harness.
"How to Use the Tru Fit Enhanced Strength Harness", Kurgo Dog Gear, YouTube.
Kornblith et al, "Similarity of Neural Network Representations Revisited", arXiv:1905.00414v4 [cs.LG] Jul. 19, 2019.
Nguyen et al., "Do Wide and Deep Networks Learn the Same Things? Uncovering How Neural Network Representations Vary With Width and Depth", 1 arXiv:2010.15327v2 [cs.LG] Apr. 10, 2021.
Standley et al, "Which Tasks Should Be Learned Together in Multi-task Learning?", arXiv:1905.07553v4 [cs.CV] Sep. 3, 2020.
Zamir et al., "Taskonomy: Disentangling Task Transfer Learning", Proceedings of the IEEE Conference on Computer Vision and Pattern Recognition (CVPR), 2018, pp. 3712-3722.

* cited by examiner

*Primary Examiner* — Abhishek Sarma
(74) *Attorney, Agent, or Firm* — Frank A. MacKenzie; Brooks Kushman P.C.

(57) ABSTRACT

A computer that includes a processor and a memory, the memory including instructions executable by the processor to execute a multi-task learning (MTL) neural network that includes multi-task layers and single-task layers, and that is configured to receive an image as input to a first one of the multi-task layers and to output respective predictions for each of a plurality of tasks from respective ones of the single-task layers. Activation tensors can be output from the multi-task layers and can be provided as input to the single-task layers.

16 Claims, 10 Drawing Sheets

MULTI-TASK LEARNING

BACKGROUND

Computers can be used to operate systems including vehicles, robots, drones, and/or object tracking systems. Data including images can be acquired by sensors and processed using a computer to determine a location of a system with respect to objects in an environment around the system. The computer can use the location data to determine trajectories for moving a system in the environment. The computer can then determine control data to transmit to system components to control system components to move the system according to the determined trajectories.

DETAILED DESCRIPTION

Sensing systems including vehicles, robots, drones, etc., can be operated by acquiring sensor data regarding an environment around the system and processing the sensor data to determine a path upon which to operate the system or portions of the system. The sensor data can be processed to determine data regarding objects in an environment. The objects can include roadways, buildings, conveyors, vehicles, pedestrians, manufactured parts, etc. Sensor data can be processed to using neural networks to determine data regarding the environment around a system. Image data is a type of sensor data, which can include lidar data, radar data, ultrasound data, and infrared data. Image data can be acquired by video cameras, for example.

Image data can be processed by neural networks to determine multiple types of data regarding objects in an environment around a system. Processing image data to determine attributes of data of a type such as image data is referred to herein as a task. For example, a neural network can perform a semantic segmentation task, where an image is divided into labeled regions. The labeled regions can include object labels such as "conveyer belt", and "part" for a robot system, and "roadway", "vehicle", and "pedestrian" for a vehicle system. A neural network can determine object depth, where the system determines distances from a camera lens to object locations in the image typically based on data regarding the sensor and lens geometry and the location and orientation of the camera with respect to a ground plane such as a roadway. Another typical task is keypoint detection, where data points included in objects are determined in a repeatable and reliable fashion. Keypoints can include facial landmarks such as eye centers and corners, and lip corners, etc. Other keypoints can include vehicle landmarks such as wheel centers, lights, corners of windows, etc.

A system can use outputs from multiple neural network tasks to operate. For example, a computer in a robot can use a neural network to perform a sematic segmentation task to locate a part on a conveyer belt. The robot computer can then use a second neural network to perform a depth task determine a distance from a point on the robot to the part to determine a path upon which to move a robotic arm to pick the part up. The robot computer can then use a third neural network to perform a keypoint detection task to detect keypoints on the part to indicate how a gripper on the robot arm should be oriented to pick the part up securely. A computer in a vehicle can use the same three neural network tasks to locate other vehicles on a roadway using a semantic segmentation task, determine distances to the other vehicles using a depth task and locate lane markers and roadway edges using a keypoint detection task. Based on outputs from these three tasks, a computer in a vehicle can determine a vehicle path upon which to operate the vehicle on a roadway in the presence of other vehicles, for example. Vehicles are used herein as a non-limiting example of a sensing system implementation.

Techniques described herein can determine and optimize multi-task learning (MTL) neural networks which can perform multiple neural network tasks with a single, MTL neural network. Techniques described herein can determine which tasks can be combined into a single MTL neural network and determine which portions of an MTL neural network can be shared between tasks. MTL neural networks can be trained to accomplish the same results as multiple neural networks while consuming fewer computing resources, including less memory, while providing results in less time. Consuming fewer computing resources and providing results in less time can be beneficial for systems such as vehicle where computing resources and time can be limited.

A method is disclosed, including executing a multi-task learning (MTL) neural network that includes multi-task layers and single-task layers, and that is configured to receive an image as input to a first one of the multi-task layers and to output respective predictions for each of a plurality of tasks from respective ones of the single-task layers and wherein activation tensors output from the multi-task layers are provided as input to the single-task layers. The MTL can include one set of multi-task layers for the plurality of tasks. The multi-task layers can include convolutional layers. The MTL can include single-task layers for each task of the plurality of tasks. The single-task layers can include fully connected layers. The MTL neural network can be generated by training a single-task neural network for each of the plurality of tasks based on a subset of training images. The single-task neural networks can be combined into the MTL neural network by generating activation tensors from a subset of layers of the single-task neural networks based on a subset of the training images, generating centered kernel alignment (CKA) similarity matrices for pairs of activation tensors from pairs of multi-task neural networks and configuring the MTL neural network based on a metric determined based on the CKA similarity matrices.

An optimal depth of the MTL neural network can be determined by determining centered kernel alignment (CKA) similarity matrices on combinations of layers of the MTL neural network and plotting values of sub-matrix summation S for sub-matrices of the CKA similarity matrices to determine depth redundancy. A vehicle path can be determined based on predictions output from the MTL neural network. The vehicle can be operated by controlling vehicle propulsion, vehicle steering, and vehicle brakes based on the vehicle path. The optimal depth can be determined based on determining a knee in the sub-matrix summation graph. A task similarity metric can be determined by summing and normalizing the diagonal sums of a CKA similarity matrix. The task similarity metric can divide the diagonal sums by the product of the tensors times the absolute value of the index. The task similarity metric can be compared to an empirically determined value.

Further disclosed is a computer readable medium, storing program instructions for executing some or all of the above method steps. Further disclosed is a computer programmed for executing some or all of the above method steps, including a computer apparatus, programmed to execute a multi-task learning (MTL) neural network that includes multi-task layers and single-task layers, and that is configured to receive an image as input to a first one of the multi-task layers and to output respective predictions for each of a plurality of tasks from respective ones of the single-task layers and wherein activation tensors output from the multi-task layers are provided as input to the single-task layers. The MTL can include one set of multi-task layers for the plurality of tasks. The multi-task layers can include convolutional layers. The MTL can include single-task layers for each task of the plurality of tasks. The single-task layers can include fully connected layers. The MTL neural network can be generated by training a single-task neural network for each of the plurality of tasks based on a subset of training images. The single-task neural networks can be combined into the MTL neural network by generating activation tensors from a subset of layers of the single-task neural networks based on a subset of the training images, generating centered kernel alignment (CKA) similarity matrices for pairs of activation tensors from pairs of multi-task neural networks and configuring the MTL neural network based on a metric determined based on the CKA similarity matrices.

The instructions can include further instructions to determine an optimal depth of the MTL neural network by determining centered kernel alignment (CKA) similarity matrices on combinations of layers of the MTL neural network and plotting values of sub-matrix summation S for sub-matrices of the CKA similarity matrices to determine depth redundancy. A vehicle path can be determined based on predictions output from the MTL neural network. The vehicle can be operated by controlling vehicle propulsion, vehicle steering, and vehicle brakes based on the vehicle path. The optimal depth can be determined based on determining a knee in the sub-matrix summation graph. A task similarity metric can be determined by summing and normalizing the diagonal sums of a CKA similarity matrix. The task similarity metric can divide the diagonal sums by the product of the tensors times the absolute value of the index. The task similarity metric can be compared to an empirically determined value.

Figure 1:
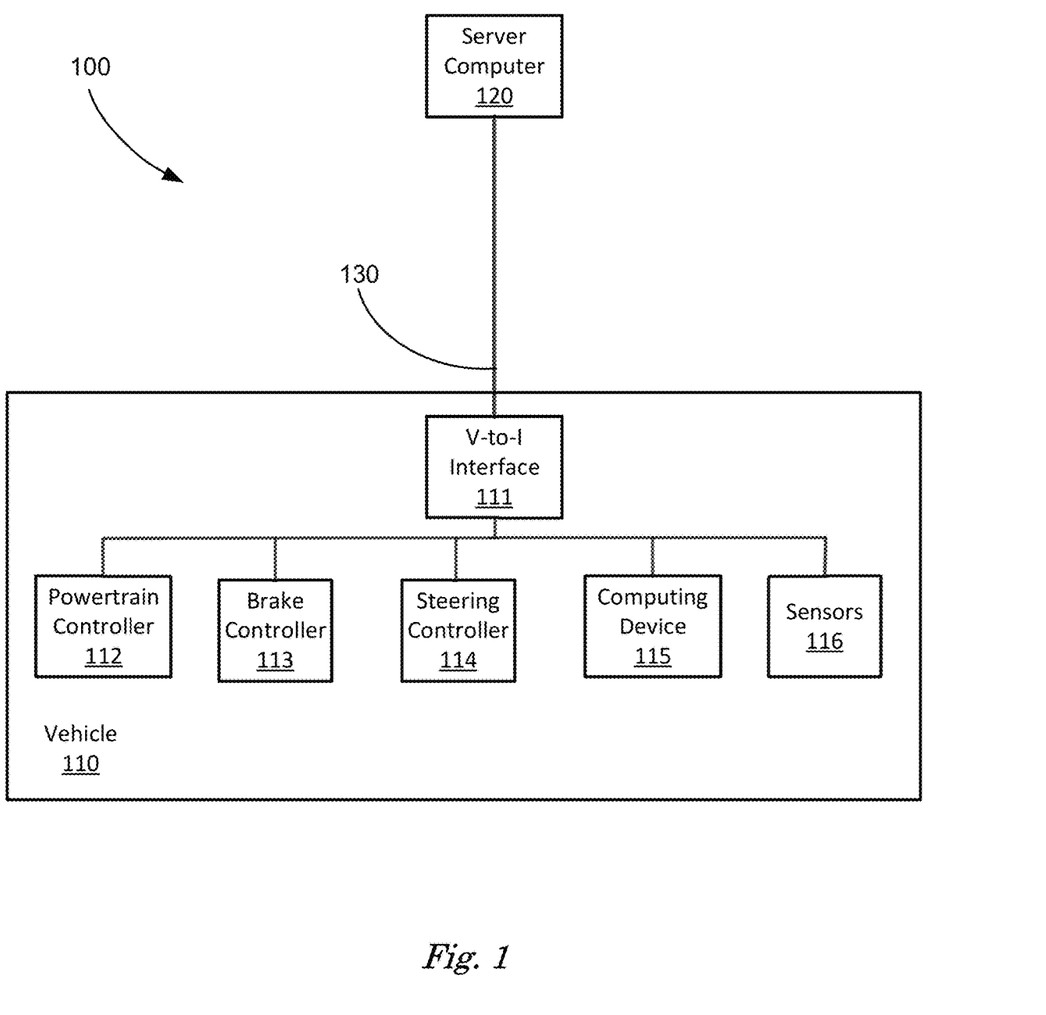
FIG. 1 is a block diagram of an example vehicle sensing system.

FIG. 1 is a diagram of a sensing system 100. Sensing system 100 includes a vehicle 110. One or more vehicle 110 computing devices 115 can receive data regarding the operation of the vehicle 110 from sensors 116. The computing device 115 may further provide control inputs to one or more electronic control units (ECUs) in the vehicle 110, such as, powertrain controller 112, brake controller 113, and/or steering controller 114. The system 100 can further include a server computer 120 that can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers and/or sensors such as controllers 112, 113, 114 and/or sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110, e.g., to provide control inputs to one or more controllers 11, 113, 114.

The vehicle 110 is generally a land-based vehicle 110 having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, i.e., a computer processor and memory and configuration for communication via a network 130, with the vehicle 110 V2X interface 111 and computing device 115, and therefore these features will not be described further. A server computer 120 can be used to develop and train software that can be transmitted to a computing device 115 in a vehicle 110.

Figure 2:
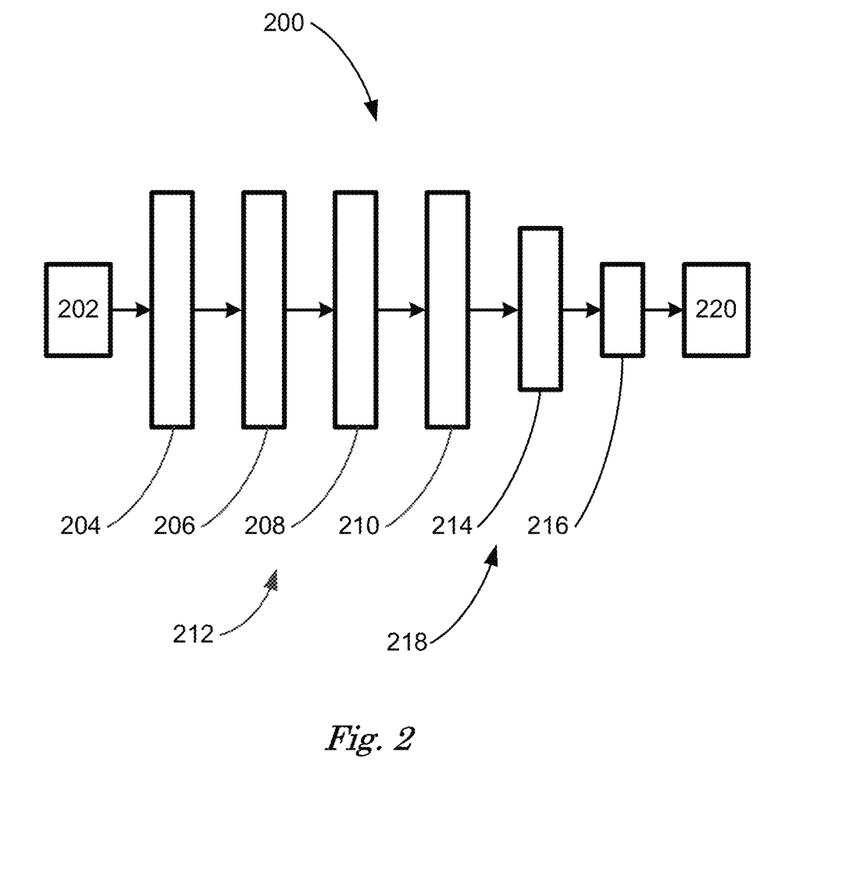
FIG. 2 is a diagram of an example neural network.

FIG. 2 is a diagram of a convolutional neural network 200. Convolutional neural network 200 can input an image 202 and output a task prediction 220. Convolutional neural network 200 include convolutional layers 204, 206, 208, 210, (collectively convolutional layers 212) and fully connected layers 214, 216 (collectively fully connected layers 218). Convolutional layers input image data and convolve the image data using convolutional kernels which are typically k×k neighborhoods where k is a small number such as 3, 5, 7, 9, etc. The operation performed by the convolution kernel is determined by the numbers included in the k×k neighborhoods, called weights. Fully connected layers 218 calculate linear or nonlinear algebraic functions based on their input. They are referred to as fully connected because any input value can be combined with any other input value. The linear or nonlinear algebraic function determined by fully connected layers 218 is determined by parameters also called weights.

Convolutional neural networks 200 are trained by compiling a training dataset that includes images 202 and ground truth data which indicates a correct task prediction 220 to be output from the convolutional neural network 200 in response to an input image 202. Ground truth is determined by a process separate from the neural network and can include human inspection and measurement of the image data and the scene that was imaged. Training the convolutional neural network 200 can include processing each image 202 in the training dataset hundreds or thousands of times, each time comparing the output task prediction 220 to the ground truth to determine a loss function. The loss function is back propagated through the fully connected layers 218 and the convolutional layers 212 from back to front, altering the weights included in the fully connected layers 218 and convolutional layers 212 to minimize the loss function. When the loss function is sufficiently minimized, e.g., when changing the weights does not make the loss function smaller, the convolutional neural network 200 may be considered to be trained, and the current weights are saved.

The outputs from each convolutional layer 212 and each fully connected layer 218 to the next layer in the convolutional neural network 200 are called tensors. The tensor is output from a layer via an activation function that can condition the output. For example, ReLu activation conditions the output to be positive. Output from a convolutional layer 212 or fully connected layer 218 via an activation function is called an activation tensor herein. The activation tensors output by the layers 212, 218 of a trained convolutional neural network in response to a particular input image 202 can be used to characterize the convolutional neural network 200 and will be used herein to determine similarities between two or more convolutional neural networks, for example.

Figure 3:
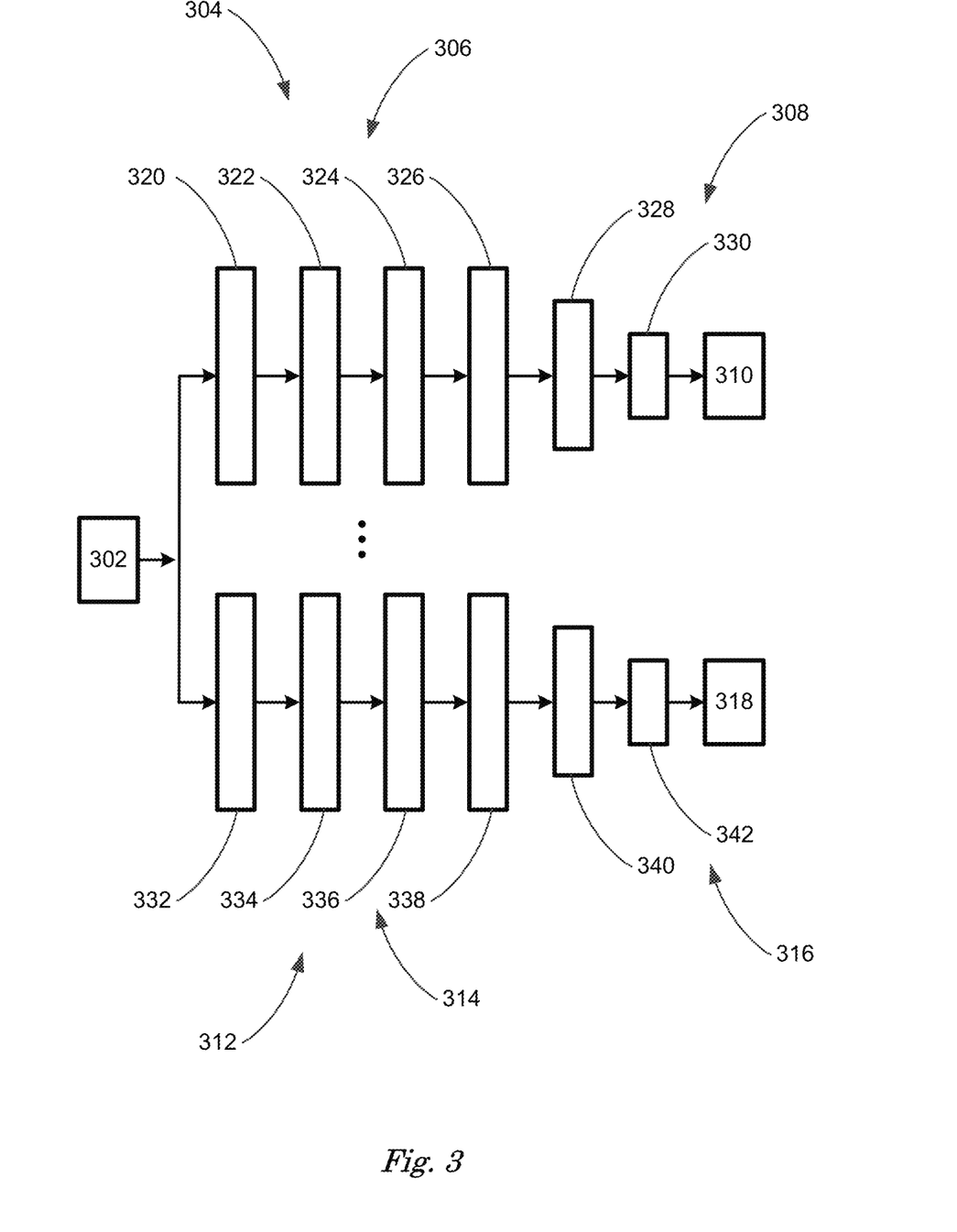
FIG. 3 is a diagram of example of multiple neural networks.

FIG. 3 is a diagram of two or more single-task neural networks 304, 312. Additional single-task neural networks 304, 312 are indicated by the ellipsis. Single-task neural networks 304, 312 include convolutional layers 320, 322, 324, 326 and 332, 334, 336, 338, respectively (collectively convolutional layers 306 and 314, respectively), and fully connected layers 328, 330 and 340, 342, respectively (collectively fully connected layers 308 and 316, respectively). Single-task neural networks 304, 312 input an image 302, and output predictions 310, 318, respectively. Predictions 310, 318 are results of processing input images 302 by single-task neural networks 304, 312 and can for example include segmented images 302, determined distances to objects included in images 302, and/or key points detected in images 302. Single-task neural networks 304, 312 can be included in a computing device 115 included in a vehicle 110. The image 302 can be acquired by a video camera included in the vehicle 110. The single-task neural networks d304, 312 can execute on the computing device 115 to determine predictions 310, 318 for tasks related to operating the vehicle 110. Single-task neural networks 304, 312 are referred to as single-task because they each determine a prediction 310, 318 related to a single-task.

As discussed above, tasks related to operating the vehicle 110 can include outputting predictions such as semantic segmentation, depth determination, and key point detection, for example. Single-task neural networks 304, 312 can be trained to determine predictions 310, 312 indicated by these tasks. For example, based on inputting an image 302, a first one of the single-task neural networks 304, 312 can output a prediction 310, 318 that includes an image with labeled regions that indicate vehicles, pedestrians, roadways, buildings, foliage, etc. Based on the same image 302, a second one of the single-task neural networks 304, 312 can output a prediction 310, 318 that includes distances from the video camera to objects in the image 302, for example vehicles and pedestrians. Further based on the same image 302, a third single-task neural network 304, 318 can output a prediction 310, 318 that includes an image with keypoints that indicate data points in the image such as lane markings, roadway exits and entrances, and roadway edges, for example.

The output predictions 310, 318 can be used by computing device 115 to operate the vehicle 110. For example, computing device can determine a vehicle path based on the predictions 310, 315. A vehicle path can be defined or determined according to a polynomial function that, based on part on a current location of the vehicle 110, determines a future vehicle state including a predicted future location for the vehicle. The vehicle path indicates a series of connected current and future predicted locations that the vehicle 110 can assume while maintaining upper and lower limits on lateral and longitudinal accelerations, maintaining minimum distances with which the vehicle 110 can approach object such as other vehicles and pedestrians, and maintaining predetermined relationships with roadway edges and lane markers. Computing device 115 can operate vehicle 110 on the vehicle path by transmitting commands to controllers 112, 113, 114 to control vehicle propulsion, steering and brakes. If n tasks are required to operate a vehicle 110, n single-task neural networks 304, 312 can be required to execute on a computing device 115 included in a vehicle 110.

Figure 4:
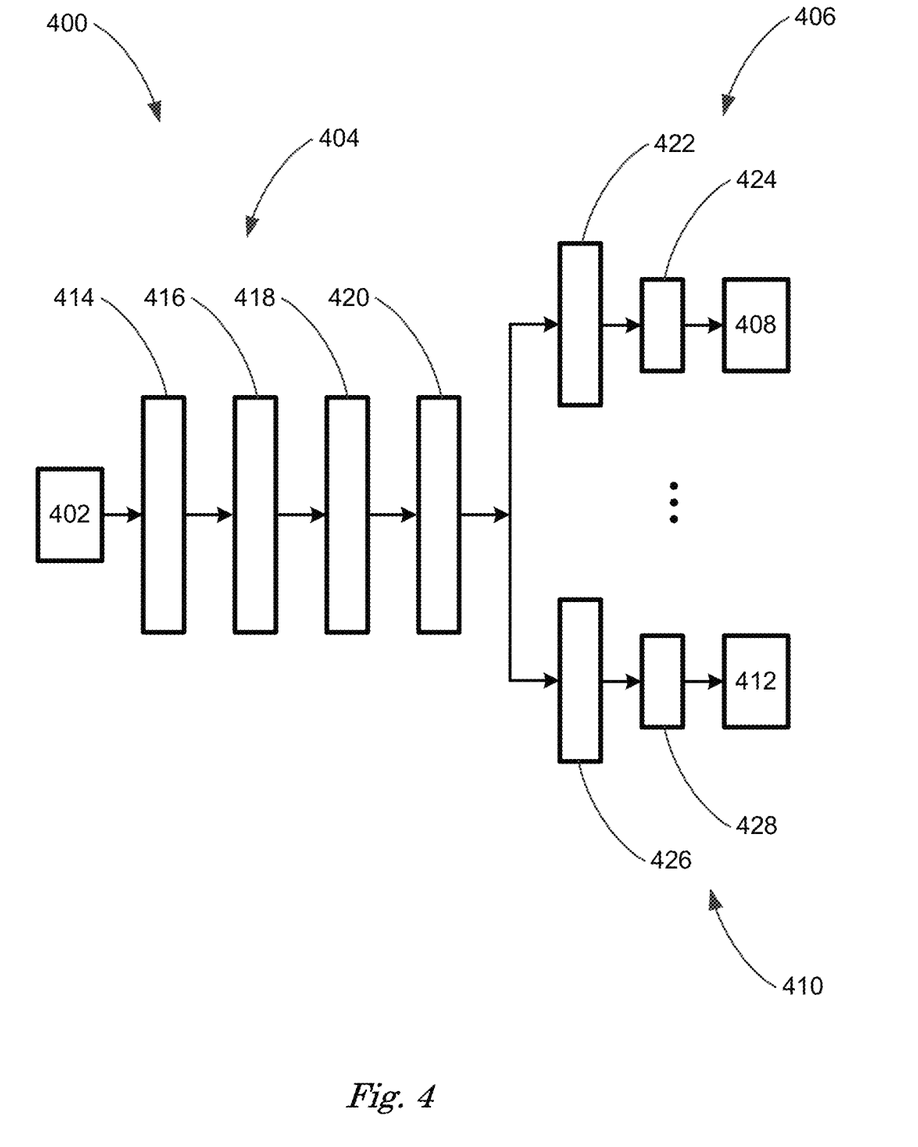
FIG. 4 is a diagram of an example multi-task learning (MTL) neural network.

FIG. 4 is a diagram of a multi-task learning (MTL) neural network 400. An MTL neural network 400 includes one set of shared/backbone layers 414, 416, 418, 420 (collectively shared/backbone layers 404) that process data for more than one task and more than one set of single-task layers 422, 424 and 426, 428, respectively (collectively single-task layers 406 and 410, respectively) that each process data for a single task. An MTL neural network 400 inputs an image 402 and outputs predictions 408, 412. An MTL includes shared/backbone layers 404 and two or more single-task layers 406, 410. Additional single-task layers are indicated by the ellipsis. Each single-task layer 406, 410 outputs a prediction 408, 412, respectively. Shared/backbone layers 404 typically include convolutional layers. Single-task layers 406, 410 typically include both convolutional and fully connected layers. An MTL neural network 400 can be configured from single-task neural networks 304, 312 based on a metric determined based on centered kernel alignment (CKA) similarity matrices 502, 504, 506 as described below in relation to FIG. 5.

An MTL neural network 400 with n single-task layers 406, 410 can output the same predictions 408, 412 as n single-task neural networks 304, 312 in less time, using fewer computing resources and less memory. MTL neural networks 400 are generated by determining which calculations are shared between single-task neural networks 304 312 and combining them into shared/backbone layers 404. Rather than repeating the shared/backbone calculations n times for each single-task neural network, MTL neural networks 400 perform the shared/backbone calculations once and distribute the activated tensors determined by the shared/backbone layers 404 to each of the single-task layers 406, 410. Techniques for determining an MTL neural network 400 based on n single-task neural networks 304, 312 and a subset of training images is described in relation to FIG. 5, below.

Figure 5:
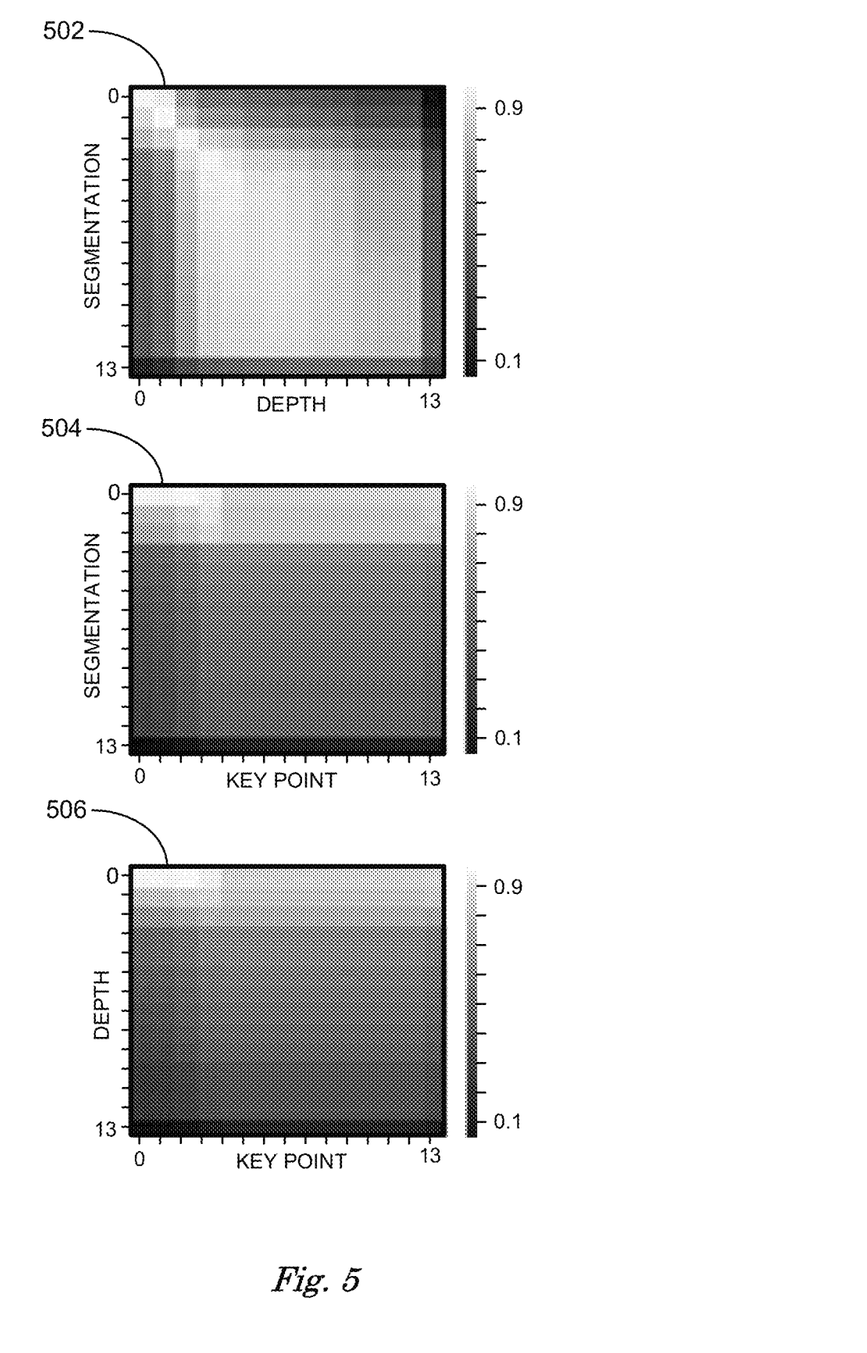
FIG. 5 is a diagram of example centered kernel alignment (CKA) matrices.

FIG. 5 is a diagram of three centered kernel alignment (CKA) similarity matrices 502, 504, 506. CKA can be used to determine similarities between trained neural networks 304, 312. CKA similarity matrices 502, 504, 506 can be determined based on a subset of training images 302 from a training dataset used to train single-task neural networks 304, 312. Training datasets are typically divided into training data, validation data, and test data. Training data is used to determine weights and biases for a neural network, e.g., determine the parameters that control operation of the neural network. Each image in the training portion of the training dataset can be processed by a neural network hundreds or thousands of times to determine weights and biases. Validation data is used to provide an unbiased evaluation of neural network fit on the training dataset while fine-tuning neural network hyperparameters. Examples of hyperparameters are activation parameters that control the conditioning of latent variables as they are passed from one layer to the next of a neural network. Test data is used to evaluate the performance of the neural network to compare the trained neural network to previous or competing models, for example. CKA similarity matrices are determined based on a validation subset of a training dataset.

CKA is applied to the activated tensors output by two layers from each of two single-task neural networks 304, 312 respectively, and determines a value between 0 and 1 that indicates the similarity between the two layers. Similarity is a measure of the normalized difference between the outputs from the two layers in response to the same input, e.g., the same input image 302. Derivation and calculation of CKA is described in "Similarity of Neural Network Representations Revisited", Simon Kornblith, Mohammad Norouzi, Honglak Lee, and Geoffrey Hinton, Proceedings of the 36$^{th}$ International Conference on Machine Learning, Long Beach, CA, PMLR 97, 2019.

CKA can be applied to the layers of pairs of trained single-task neural networks 304, 312 by inputting the same images 302 to each of the trained single-task neural networks 304, 312 and recording the activated tensors output be each layer. In this example, the first 14 layers of each single-task neural network 304, 312 is compared. CKA is calculated for each the layers of the pairs of trained single-task neural networks 304, 312 and graphed as illustrated in FIG. 5. CKA similarity graph 502 determines matrices that include the CKA similarity scores for the 14 layers of the trained single-task neural network 304, 312 that determines predictions 310, 318 regarding semantic segmentation (y-axis) versus CKA similarity scores for the 14 layers of the trained single-task neural network 304, 312 that determines predictions 310, 318 regarding depth determination (x-axis). CKA similarity matrix 504 includes the CKA similarity scores for a trained neural network 304, 312 that determines semantic segmentation versus CKA similarity scores for a trained neural network 304, 312 that determines key points. CKA similarity matrix 504 includes the CKA similarity scores for a trained neural network 304, 312 that determines semantic segmentation versus CKA similarity scores for a trained neural network 304, 312 that detects key points.

Figure 6:
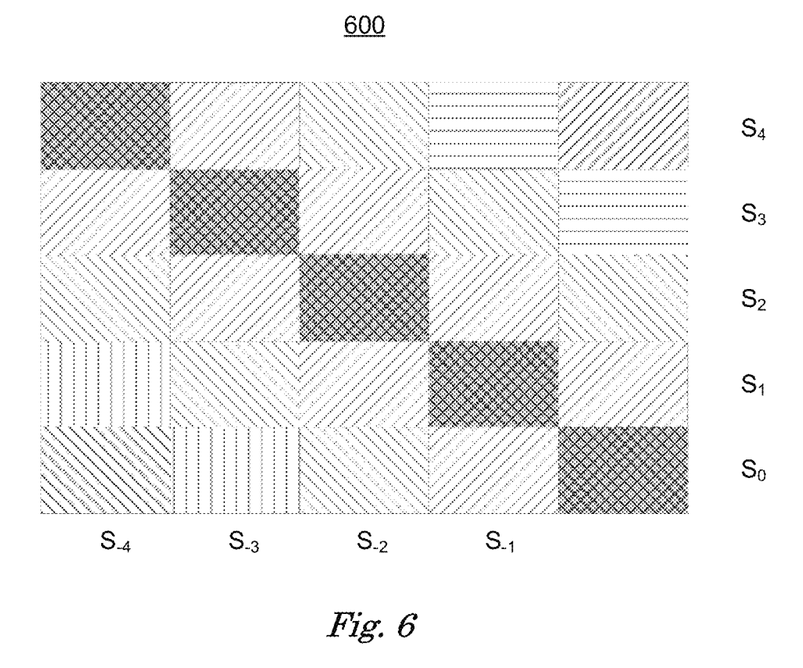
FIG. 6 is a diagram of CKA diagonal sum matrix.

FIG. 6 is a diagram of a diagonal sum matrix 600 that can be formed for each of the CKA similarity matrices 502, 504, 506. Crosshatch shading of diagonal sum matrix 600 entries indicate numerical values of diagonal sums $S_i$. A task similarity metric M for each task pair can be determined by first summing along the diagonals of each CKA similarity matrix 502, 504, 506 from right to left to determine diagonal sums $S_i$. For an N×N matrix, this will include sums $S_{-N+1}, \ldots, S_{+1}, S_0, S_1, \ldots, S_N$. Diagonal sum matrix 600 illustrates the diagonal sums for a 5×5 CKA similarity matrix, for example. A task similarity metric M for a task pair of trained neural networks 304, 312 can be determined based on the diagonal sums $S_i$ by the equation:

$$M = \sum_{i=-N+1}^{N-1} \frac{S_i}{len(S_i) \cdot (1 + abs(i))}, \quad (1)$$

which sums and normalizes the diagonal sums $S_i$ of a CKA similarity matrix 502, 504, 506.

A task similarity M can be determined for each of the CKA similarity matrices 502, 504, 506 to determine the similarity between the layers of the single-task neural networks 304, 312 for each pair of tasks. The task similarity M can be compared to a user-determined threshold to determine whether to combine the layers of the trained neural networks 304, 312 into an MTL neural network 400. The threshold can be determined empirically for a given subject domain, such as vehicle guidance, by combining the trained neural networks 304, 312 using a given threshold and testing the resulting MTL neural network 400 while operating a vehicle using the training dataset and determining whether the output predictions 408, 412 match the ground truth with acceptable accuracy, for example 99% accuracy. The similarity metric M can be used to determine which layers to combine from which single-task neural networks 304, 312 to form an MTL neural network 400. Not all single-task neural networks 304, 312 for tasks related to an overall task such as vehicle guidance are guaranteed to be combined into an MTL neural network 400. In some examples, more than one MTL neural network 400 can be determined for a group of single-task neural networks 304, 312. In some examples, one or more single-task neural networks 304, 312 can be determined to not be able to be combined with other single-task neural networks 304, 312.

Figure 7:
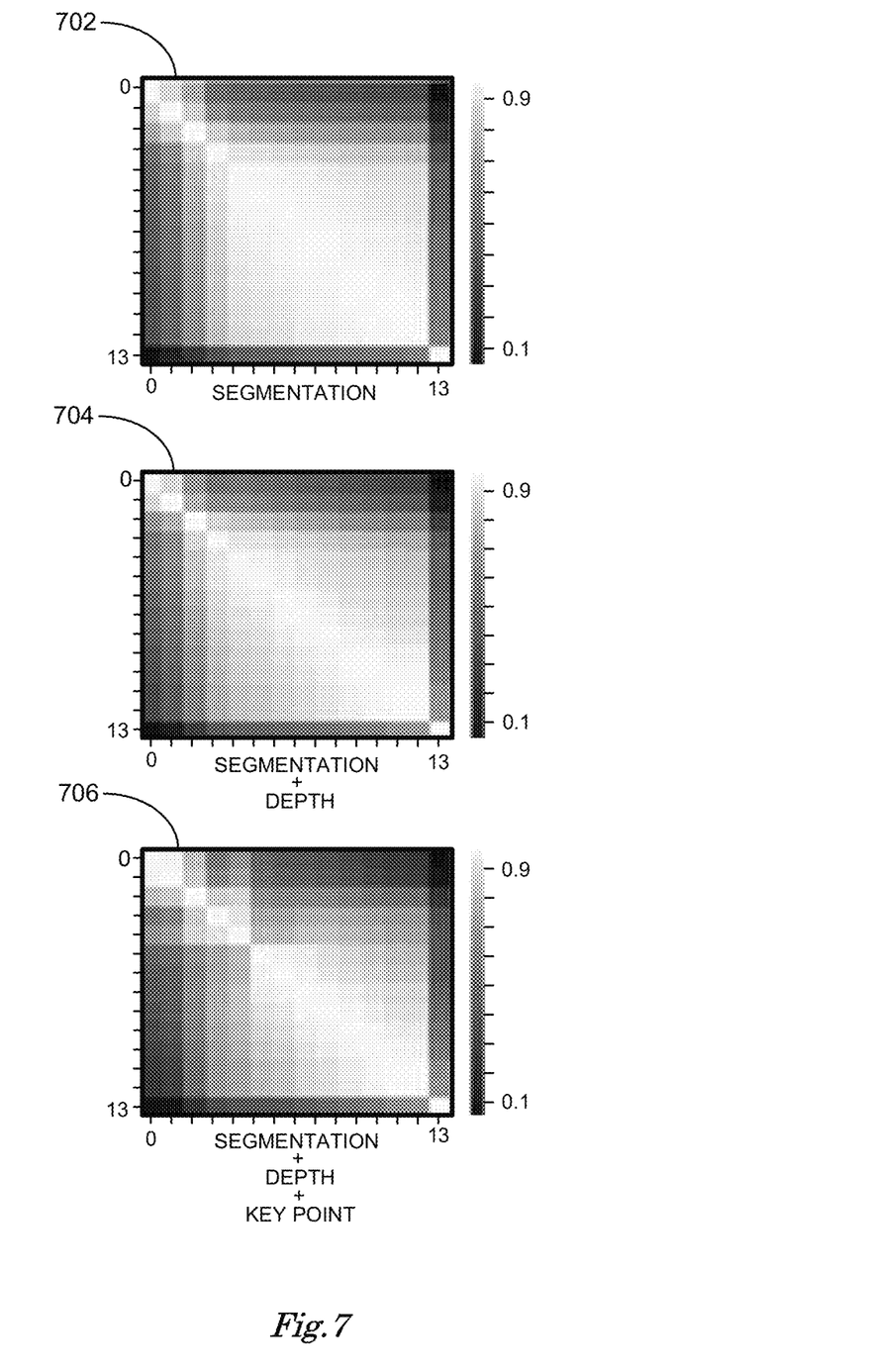
FIG. 7 is a diagram example CKA matrices for MTL neural networks.

FIG. 7 is a diagram of three CKA similarity matrices 702, 704, 706 for determining an optimal depth, e.g., the optimal number of layers, for an MTL neural network 400. CKA similarity matrices 702, 704, 706 plot CKA similarity values for 14 layers of an MTL neural network against themselves to permit determination of when activation tensors output from the layers become redundant and can be eliminated without reducing accuracy. CKA similarity matrices 702, 704, 706 plot CKA similarity values for an MTL neural network 400 that includes only semantic segmentation (CKA similarity matrix 702), semantic segmentation and depth determinination (CKA similarity matrix 704), and semantic segmentation, depth determinination, and key point detection (CKA similarity matrix 706).

Figure 8:
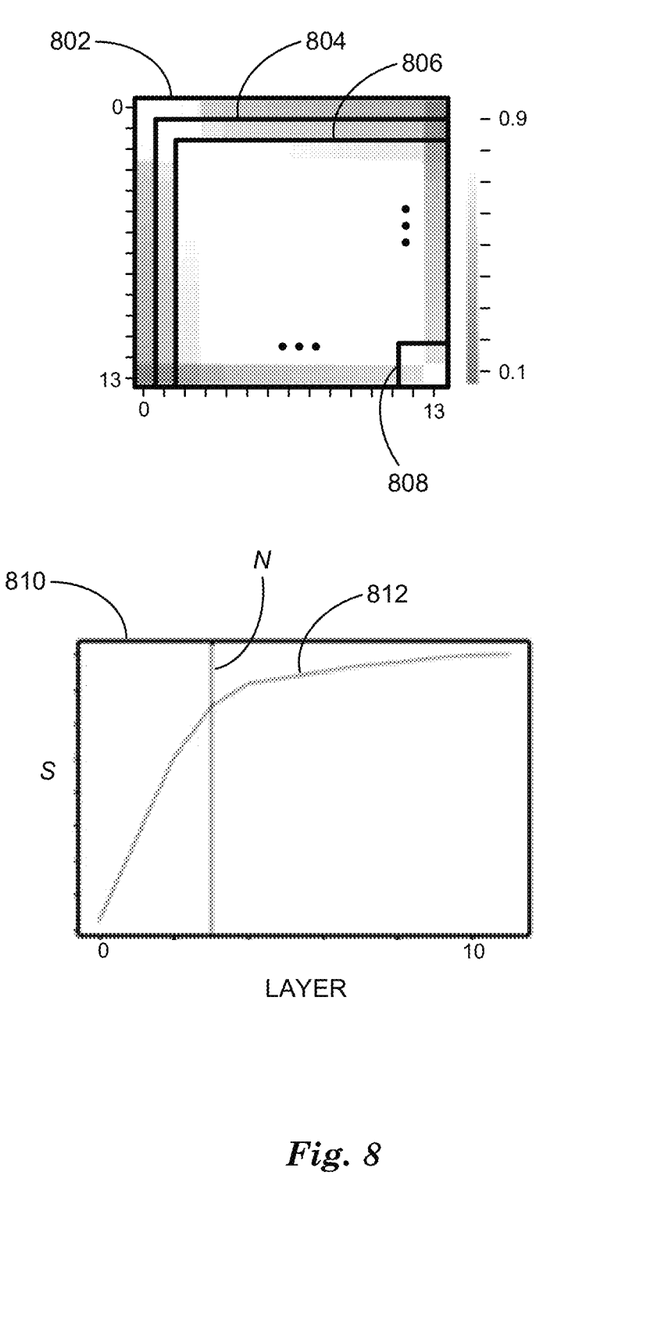
FIG. 8 is a diagram of processing of CKA matrices.

CKA similarity matrices 702, 704, 706 illustrate the relationship between the number of combined tasks and MTL neural network 400 depth. Required depth is the number of layers required to determine results in the shared/backbone layers 404 of an MTL neural network 400. The contribution of a given layer to the overall result from the shared/backbone layers 404 can be determined by measuring the CKA similarity value for that layer versus the other layers of the shared/backbone layers 404. This can be illustrated by summing values included in sub-matrices of CKA similarity matrices 702, 704, 706 formed by comparing activation tensors output by the layers of a MTL neural network 400 in the columns of the sub-matrices to the same activations tensors in the rows of the sub-matrices. FIG. 8 illustrates a numerical technique for determining optimal depth for an MTL neural network based on analyzing sub-matrices of a CKA similarity matrix 702, 704, 706.

FIG. 8 is a diagram that includes a CKA similarity matrix 802 and a graph 810 illustrating a technique for determining an optimal depth for an MTL neural network 400 based on depth redundancy. CKA similarity matrix 802 can be determined based on the layers of an example MTL neural network 400 using techniques described above in relation to FIG. 5. The CKA similarity matrix 802 can be determined by comparing the activation tensors output by a layer of an MTL neural network 400 with activation tensors output by other layers of the same MTL neural network 400. CKA values on the principal diagonal of CKA similarity matrix 802 indicate activation tensors being compared to themselves and will have a value of 1.0 by definition.

Optimal depth for an MTL neural network 400 can be determined by summing the CKA similarity matrix 802 and sub-matrices 804, 806, 808. The ellipses in CKA similarity matrix 802 indicate a plurality of sub-matrices that can be determined between sub-matrix 806 and sub-matrix 808. The sub-matrices 804, 806, 808 indicate CKA similarity values for increasingly small subsets of layers of MTL neural network 400. The values of sub-matrix summations S 812 for the sub-matrices 804, 806, 808 indicate the additional data regarding the tasks computed by increasingly small subsets of layers closer to the output of the shared/backbone layers 404 to the single-task layers 406, 410 of an MTL neural network 400.

Graph 810 plots the values of sub-matrix summations S 812 on the y-axis versus the number of the beginning layer used to determine sub-matrix 804, 806, 808 on the x-axis. The graph 810 is inspected to determine a "knee" in the sub-matrix summations S 812 line. The "knee" in in the sub-matrix summations S 812 line is the point, indicated by line N in graph 810 where the change in the value of sub-matrix summations S 812 begins to level off. The point indicated by line N could be numerically indicated by calculating derivatives of the sub-matrix summations S 812 at each layer number and comparing it to a threshold, for example. The point indicated by the line N is indicates the number of layers to include in the shared/backbone layers 404 of an MTL neural network 400. The layer numbers above the value N can be eliminated without reducing MTL neural network 400 accuracy.

Figure 9:
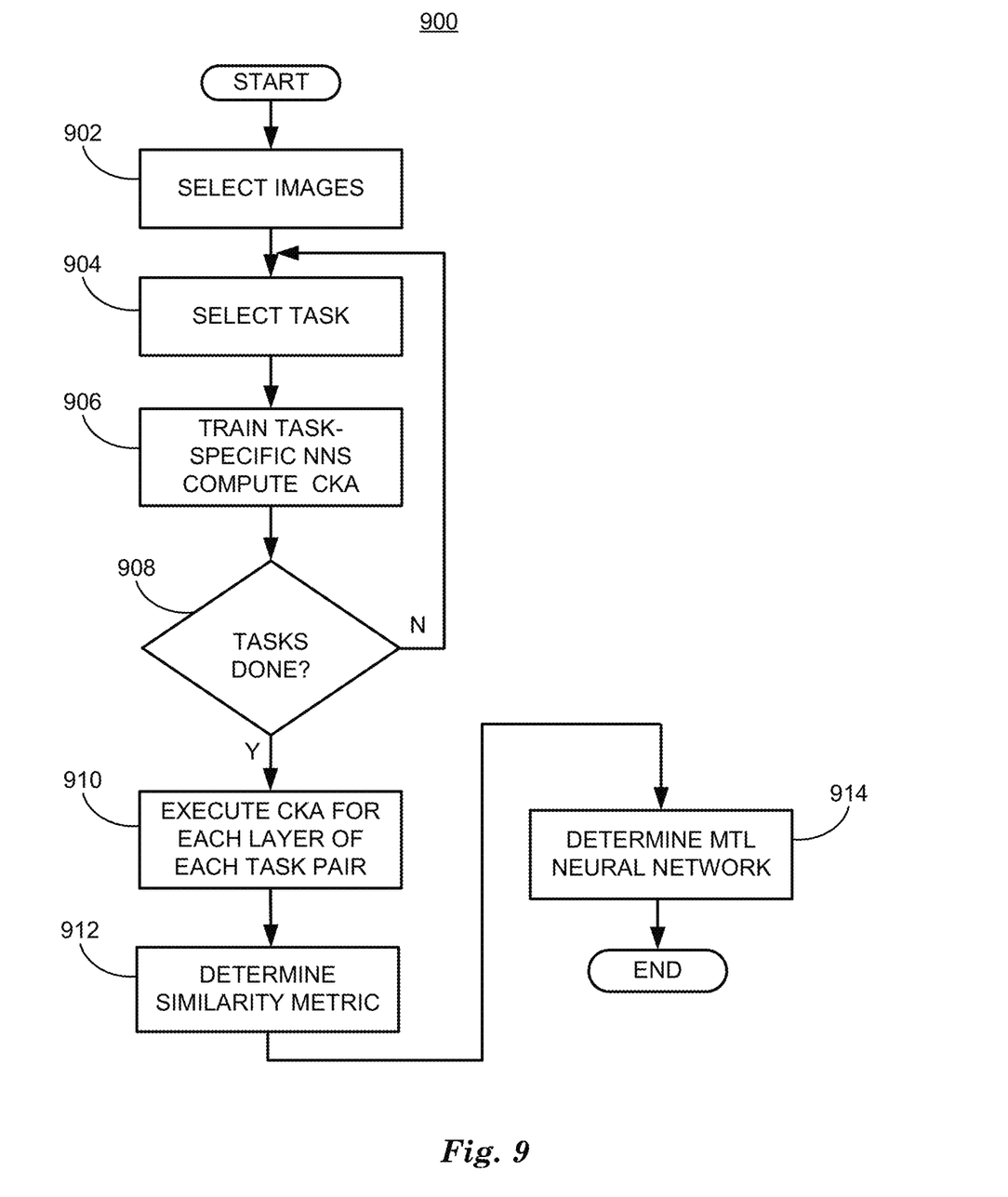
FIG. 9 is a flowchart diagram of an example process to determine a multi-task learning neural network.

FIG. 9 is a flowchart of a process 900 for determining an MTL neural network 400 based on task-specific neural networks 304, 312. Process 900 can be implemented in a server computer 120. Process 900 includes multiple blocks that can be executed in the illustrated order. Process 900 could alternatively or additionally include fewer blocks or can include the blocks executed in different orders.

Process 900 begins at block 902 where a training dataset of images 302 and ground truth for each image 302 in the training dataset are collected. The training dataset of images 302 can be determined by acquiring images 302 from sensors included in a vehicle 110, for example. Video camera images 302 are used herein as a non-limiting example, however, lidar images, radar images, and ultrasound images, etc. could be used to train task specific neural networks 304, 312.

At block 904 a task is selected to be used to train one of the task-specific neural networks 304, 312 from a determined list of tasks. Non-limiting examples of tasks used to train the task-specific neural networks 304, 312 for vehicle guidance include semantic segmentation, depth determination, and key point detection as described above in relation to FIG. 3.

At block 906 a task-specific neural networks 304, 312 is trained on server computer 120 as described above in relation to FIG. 3. Following training, a subset of images 302 from the training dataset is selected and activation tensors output from the layers of task-specific neural network 304, 312 is compiled and activation tensors are collected for the layers of the trained task-specific neural network 304, 312.

At block 908 the server computer 120 determines whether task-specific neural networks 304, 312 have been trained for each of the tasks. If not, process 900 returns to block 904 to select the next task and train a task-specific neural network 304, 312 to perform that task. If the tasks are complete, process 900 passes to block 910.

At block 910 server computer 120 calculates a CKA similarity values based on the collected activation tensors for the layers of trained task-specific neural networks 304, 312 and generate CKA similarity matrices 502, 504, 506 for the pairs of trained task-specific neural networks 304, 312 as described in relation to FIG. 5, above.

At block 912 computing device 120 determines a task similarity metric M for the diagonals of each of the CKA similarity matrices 502, 504, 506 as described above in relation to FIG. 6.

At block 914 an MTL neural network 400 is determined based on the task-specific neural networks 304, 312 by combining layers of the task-specific neural networks 304, 312 based on the task similarity metric M 812 as described above in relation to FIGS. 4-6. Following block 914 process 900 ends.

Figure 10:
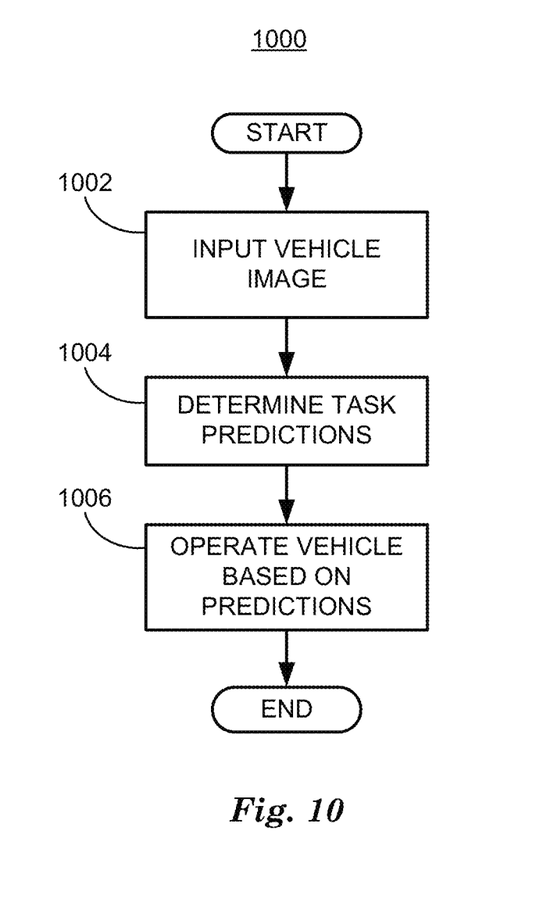
FIG. 10 is a flowchart diagram of an example process to operate a vehicle based on output from a multi-task neural network.

FIG. 10 is a flowchart a process 1000 for operating a vehicle 110 based on predictions output from an MTL neural network 400. Process 1000 can be implemented on a computing device 115 included in a vehicle 110. Process 1000 includes multiple blocks that can be executed in the illustrated order. Process 1000 could alternatively or additionally include fewer blocks or can include the blocks executed in different orders.

Process 1000 begins at block 1002, where a computing device 115 included in a vehicle 110 acquires image 402 data from a sensor included in the vehicle 110. Image 402 data can be an image 402 acquired by a video camera, for example.

At block 1004 computing device 115 inputs an image 402 to a trained MTL neural network 400. MTL neural network 400 has been configured, trained and optimized as described in relation to FIGS. 2-10 above and transmitted to computing device 115 from a server computer 120. The MTL neural network 400 outputs one or more predictions 408, 412 regarding the input image 402.

At block 1006 computing device 115 uses the predictions 408, 412 output by MTL neural network 400 to determine a vehicle path for a vehicle 110 as described in relation to FIG. 4, above. A vehicle can operate on a roadway based on a vehicle path by determining commands to direct the vehicle's powertrain, braking, and steering components to operate the vehicle so as to travel along the path. The vehicle path can be used to direct a vehicle 110 from a current location to another location in an environment around the vehicle based on the predictions 408, 412 output by MTL neural network 400. A vehicle 110 can be operated along a vehicle path by transmitting commands to controllers 112, 113, 114 to control vehicle propulsion, steering and brakes. Following block 1006 process 1000 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
   a computer that includes a processor and a memory, the memory including instructions executable by the processor to:
   execute a multi-task learning (MTL) neural network that includes multi-task layers and single-task layers, and that is configured to receive an image as input to a first one of the multi-task layers and to output respective predictions for each of a plurality of tasks from respective ones of the single-task layers;
   wherein the MTL neural network is generated by training a single-task neural network for each of the plurality of tasks based on a subset of training images;
   wherein activation tensors output from the multi-task layers are provided as input to the single-task layers; and
   wherein the single-task neural networks are combined into the MTL neural network by:
      generating activation tensors from a subset of layers of the single-task neural networks based on a subset of the training images;
      generating centered kernel alignment (CKA) similarity matrices for pairs of activation tensors from multi-task neural networks; and
      configuring the MTL neural network based on a metric determined based on the CKA similarity matrices.

2. The system of claim 1, wherein the MTL includes one set of shared/backbone layers for the plurality of tasks.

3. The system of claim 2, wherein the shared/backbone layers include convolutional layers.

4. The system of claim 1, wherein the MTL includes single-task layers for each task of the plurality of tasks.

5. The system of claim 4, wherein the single-task layers include fully connected layers.

6. The system of claim 1, wherein an optimal depth of the MTL neural network is determined by determining centered kernel alignment (CKA) similarity matrices on combinations of layers of the MTL neural network and plotting values of sum-matrix summation S for sub-matrices of the CKA similarity matrices to determine depth redundancy.

7. The system of claim 1, wherein the instructions include further instructions to determine a vehicle path based on predictions output from the MTL neural network.

8. The system of claim 7, wherein the instructions include further instructions to operate the vehicle by controlling vehicle propulsion, vehicle steering, and vehicle brakes based on the vehicle path.

9. A method, comprising:
   executing a multi-task learning (MTL) neural network that includes multi-task layers and single-task layers, and that is configured to receive an image as input to a first one of the multi-task layers and to output respective predictions for each of a plurality of tasks from respective ones of the single-task layers;
   wherein the MTL neural network is generated by training a single-task neural network for each of the plurality of tasks based on a subset of training images;
   wherein activation tensors output from the multi-task layers are provided as input to the single-task layers; and
   wherein the single-task neural networks are combined into the MTL neural network by:
      generating activation tensors from a subset of layers of the single-task neural networks based on a subset of the training images;
      generating centered kernel alignment (CKA) similarity matrices for pairs of activation tensors from multi-task neural networks; and
      configuring the MTL neural network based on a metric determined based on the CKA similarity matrices.

10. The method of claim 9, wherein the MTL includes one set of multi-task layers for the plurality of tasks.

11. The method of claim 10, wherein the multi-task layers include convolutional layers.

12. The method of claim 9, wherein the MTL includes single-task layers for each task of the plurality of tasks.

13. The method of claim 12, wherein the single-task layers include fully connected layers.

14. The method of claim 9, wherein an optimal depth of the MTL neural network is determined by determining centered kernel alignment (CKA) similarity matrices on combinations of layers of the MTL neural network and plotting values of sub-matrix summation S for sub-matrices of the CKA similarity matrices to determine depth redundancy.

15. The method of claim 9, further comprising determining a vehicle path base on predictions output from the MTL neural network.

16. The method of claim 15, further comprising operating the vehicle by controlling vehicle propulsion, vehicle steering, and vehicle brakes based on the vehicle path.

\* \* \* \* \*

UNITED STATES PATENT AND TRADEMARK OFFICE
CERTIFICATE OF CORRECTION

| | | |
|---|---|---|
| PATENT NO. | : 12,387,098 B2 | Page 1 of 1 |
| APPLICATION NO. | : 18/191362 | |
| DATED | : August 12, 2025 | |
| INVENTOR(S) | : Meghana Laxmidhar Gaopande et al. | |

It is certified that error appears in the above-identified patent and that said Letters Patent is hereby corrected as shown below:

In the Claims

Column 14, Line 65, Claim 15      Change "base" to --based--

Signed and Sealed this
Seventh Day of October, 2025

John A. Squires
*Director of the United States Patent and Trademark Office*